United States Patent
Xiao et al.

(10) Patent No.: US 10,815,146 B2
(45) Date of Patent: Oct. 27, 2020

(54) GLASS CERAMIC AND PREPARATION METHOD THEREOF, AND A BOND FOR COMPOSITE GRINDING WHEEL COMPRISING THE GLASS CERAMICS AND PREPARATION METHOD AND APPLICATION THEREOF

(71) Applicants: Jiangxi Guanyi Abrasives Co., Ltd., Yichun (CN); Jingdezhen Ceramic Institute, Jingdezhen (CN)

(72) Inventors: Zhuohao Xiao, Jingdezhen (CN); Yongqing Wang, Jingdezhen (CN); Weimin Yi, Yichun (CN); Min Wu, Yichun (CN); Nir Rushkin, Yichun (CN); Chenhao Yi, Yichun (CN)

(73) Assignees: JIANGXI GUANYI ABRASIVES CO., LTD, Yichun (CN); JINGDEZHEN CERAMIC INSTITUTE, Jingdezhen (CN)

( * ) Notice: Subject to any disclaimer, the term of this patent is extended or adjusted under 35 U.S.C. 154(b) by 8 days.

(21) Appl. No.: 16/349,588

(22) PCT Filed: Dec. 29, 2017

(86) PCT No.: PCT/CN2017/119715
§ 371 (c)(1),
(2) Date: May 13, 2019

(87) PCT Pub. No.: WO2019/127324
PCT Pub. Date: Jul. 4, 2019

(65) Prior Publication Data
US 2020/0165157 A1 May 28, 2020

Related U.S. Application Data

(63) Continuation of application No. PCT/CN2017/119715, filed on Dec. 29, 2017.

(51) Int. Cl.
*C03C 10/04* (2006.01)
*C03C 10/10* (2006.01)
(Continued)

(52) U.S. Cl.
CPC ............ *C03C 10/0018* (2013.01); *B24D 3/04* (2013.01); *B24D 3/342* (2013.01);
(Continued)

(58) Field of Classification Search
CPC ... C03C 10/0009; C03C 10/0018; B24D 3/14; B24D 3/16; B24D 3/342
See application file for complete search history.

(56) References Cited

U.S. PATENT DOCUMENTS

| 4,157,897 A * | 6/1979 | Keat | B24D 3/16 |
| | | | 51/295 |
| 2020/0055162 A1 * | 2/2020 | Gasdaska | B24D 3/06 |

FOREIGN PATENT DOCUMENTS

| CN | 102923958 A | 2/2013 |
| CN | 105252435 A | 1/2016 |

(Continued)

OTHER PUBLICATIONS

State Intellectual Property Office of the P.R. China, International Search Report in International Application No. PCT/CN2017/119715 (dated Sep. 11, 2018).

*Primary Examiner* — Karl E Group
(74) *Attorney, Agent, or Firm* — Neal, Gerber & Eisenberg LLP; Thomas E. Williams; Daniel Organ

(57) ABSTRACT

The application relates to bond materials for a grinding wheel, in particular a glass ceramic and a preparation method thereof, and a bond for the composite grinding wheel. The glass ceramic is prepared from raw materials comprising kaolin, silica, diboron trioxide, lithium superoxide, albite, potassium feldspar, talc, dolomite, phosphorus
(Continued)

pentoxide, and yttrium oxide. A glass ceramic composed entirely of microcrystalline phases is obtained from the glass prepared by the above raw materials at 900-1020° C., achieving a complete conversion of the glass phase at a low temperature. The application also provides a bond for a composite grinding wheel, comprising glass ceramic and glass with mass ratio of (20-50):(50-80), the glass phase having a low flow temperature and, together with the glass ceramic phase, forming encapsulation of the abrasive particles, realizing low-temperature sintering of the grinding wheel. Microcrystalline phase in the bond results in high mechanical strength for the obtained grinding wheel.

4 Claims, 2 Drawing Sheets

(51) Int. Cl.
  *B24D 3/04* (2006.01)
  *B24D 3/34* (2006.01)
  *C03C 10/00* (2006.01)
(52) U.S. Cl.
  CPC ...... *C03C 10/0054* (2013.01); *C03C 2203/10* (2013.01); *C03C 2203/52* (2013.01)

(56) References Cited

FOREIGN PATENT DOCUMENTS

| | | |
|---|---|---|
| CN | 107160296 A | 9/2017 |
| EP | 1061056 A1 | 12/2000 |

\* cited by examiner

GLASS CERAMIC AND PREPARATION METHOD THEREOF, AND A BOND FOR COMPOSITE GRINDING WHEEL COMPRISING THE GLASS CERAMICS AND PREPARATION METHOD AND APPLICATION THEREOF

This application is a National Stage Entry of International Application Number PCT/CN2017/119715, which was filed on Dec. 29, 2017. The contents of the aforementioned application are incorporated herein by reference in their entireties.

TECHNICAL FIELD

The application belongs to the field of bond materials for grinding wheel, and in particular relates to a bond for composite grinding wheel and a preparation method and application thereof.

BACKGROUND

A grinding wheel is a commonly used grinding tool, which is obtained by high temperature sintering of abrasive particles that are bonded together with a bond. Commonly used bonds now mainly comprise ceramic bonds, glass bonds, and glass ceramic bonds, etc. The ceramic bond has the advantages of low cost and simple preparation process. However, since the ceramic bond is made by mixing and ball grounding various ceramic raw materials, it is difficult to achieve a homogenization in microscopic level, which inevitably leads to a non-homogenization in the local component of the bond. The heterogeneous bonds and abrasive particles will form different phases after high temperature sintering, and the difference in phases will lead to the difference in local performance of the obtained grinding wheel, which will result in unstable performance of the grinding wheel. In addition, when ceramics is used as a bond to prepare the grinding wheel, the ceramic bond is melted into a liquid phase at a high temperature, usually above 1200° C., so high cost and great energy consumption are required for preparing the grinding wheel with ceramic as a bond.

The glass bond is prepared by cooling a high temperature melt. By forming a liquid phase at a high temperature, various components thereof can be homogenized at the molecular level, thus realizing homogeneity at a microscopic level. In addition, the glass bond can form a liquid phase at a low temperature. Therefore, the use of glass as a bond for grinding wheel can not only improve the stability performance of the grinding wheel, but also reduce the sintering temperature of the grinding wheel and reduce energy consumption. However, due to the disorder of the glass structure, the internal atoms thereof do not form a regular tight packing, so the mechanical strength of the grinding wheel prepared with glass as a bond is inferior to that of the grinding wheel prepared with ceramic material.

In order to improve the mechanical strength performance of a grinding wheel prepared with glass as a bond, researchers have tried to subject glass to heat treatment at a high temperature to form a glass ceramic, and then use the glass ceramic as a bond. It is well known that glass ceramic is a multi-phase composite composed of a dense microcrystalline phase and a glass phase, wherein the dense microcrystalline phase is formed from a large amount of tiny crystals which are uniformly precipitated in the glass when the glass is treated by heat, light, and chemical treatments. When the sintering temperature of the grinding wheel is high, crystals will precipitate from unconverted glass phase in the glass ceramics, and it is difficult to control the type and proportion of the crystals, so a tiny change in the sintering temperature of the grinding wheel will result in significant change in the phase of the bond, which leads to adverse effect to the performance stability of the grinding wheel and results in a low production yield of qualified product. Of course, the above problems caused by the glass phase in the glass ceramic can be overcome by reducing the amount of glass phase in the glass ceramics and completely converting the glass phase into microcrystalline phase. However due to the limitation of the preparation materials, it is substantially impossible to achieve complete conversion of the glass phase in the glass ceramic at a lower temperature. If the temperature of heat treatment is increased to achieve complete conversion, the resulted glass ceramic composed entirely of the microcrystalline phase will have high liquefaction temperature, and thus high sintering temperature is required when such glass ceramic is used as a bong for the grinding wheel. The high sintering temperature will undoubtedly increase preparation cost and energy consumption for preparing the grinding wheel.

SUMMARY OF INVENTION

Therefore, in a first aspect, in order to solve the technical problem that glass ceramics composed entirely of the microcrystalline phase can be hardly obtained at a relatively low temperature, the present application provides a glass ceramic which can be completely converted at a low temperature, and also provides a preparation method thereof.

In a second aspect, in order to solve the technical problem that unconverted glass phase exists in the existing glass ceramic and is sensitive to the fluctuation of the sintering temperature of the grinding wheel when the glass ceramic is used as a bond, the present application provides a bond for composite grinding wheel, and further provides a preparation method and application thereof.

In the first aspect, the present application provides a glass ceramic, prepared from raw materials comprising kaolin, silica, diboron trioxide, lithium superoxide, albite, potassium feldspar, talc, dolomite, phosphorus pentoxide, and yttrium oxide.

Preferably, in the above glass ceramic, the kaolin, silica, diboron trioxide, lithium superoxide, albite, potassium feldspar, talc, dolomite, phosphorus pentoxide and yttrium oxide have a mass ratio of (40-60):(7-15):(5-10):(1-3):(10-15):(8-12):(5-10):(10-17):(2-7):(0.5-2).

The present application also provides a method of preparing a glass ceramic, comprising
(1) preparing a mixture by mixing the following raw materials uniformly: 40-60 parts by weight of kaolin, 7-15 parts by weight of silica, 5-10 parts by weight of diboron trioxide, 1-3 parts by weight of lithium superoxide, 10-15 parts by weight of albite, 8-12 parts by weight of potassium feldspar, 5-10 parts by weight of talc, 10-17 parts by weight of dolomite, 2-7 parts by weight of phosphorus pentoxide, and 0.5-2 parts by weight of yttrium oxide, melting the mixture at a temperature and holding at this temperature to obtain a glass liquid;
(2) quenching the glass liquid with water and drying to obtain glass particles; and
(3) heating the glass particles at 900° C.-1020° C. for 0.5-2.5 hours to obtain the glass ceramic.

Preferably, in the above method, in the step (1), the raw materials have a particle size of no less than 120 mesh, and the mixture is melted at 1200° C.-1450° C. and held at this temperature for 1-2 hours to obtain the glass liquid. In the step (2), the glass liquid is quenched by pouring it to room temperature water and then dried at 120° C.-150° C. to obtain the glass particles.

In the second aspect, the present application provides a bond for composite grinding wheel, wherein the bond comprises the glass ceramic described above or prepared by the method described above, and a glass prepared from raw materials which are the same with the raw materials for preparing the glass ceramic, wherein the glass ceramic and the glass have a mass ratio of (20-50):(50-80).

The present application also provides a method for preparing the bond described above, comprising mixing the glass ceramic obtained in step (3) with the glass particles obtained in step (2) to obtain the bond for composite grinding wheel.

Preferably, the method described above further comprises mixing the glass ceramic obtained in step (3) with the glass particles obtained in step (2) to obtain a mixture, and crushing the mixture to particle size of no less than 20 mesh and then ball grounding to particle size of no less than 500 mesh.

The present application also provides use of the bond described above or prepared by the method described above in preparing a grinding wheel green body.

Preferably, a grinding wheel green body comprising the bond is molded at a pressure of 20-50 MPa.

Preferably, the molded grinding wheel green body is held at 750-810° C. for 3-12 hours to obtain a grinding wheel.

The technical solution of the present application has the following advantages:

1. The present application provides a glass ceramic prepared from raw materials comprising kaolin, silica, diboron trioxide, lithium superoxide, albite, potassium feldspar, talc, dolomite, phosphorus pentoxide, and yttrium oxide. Glass prepared from the above raw materials can be prepared to glass ceramic composed entirely of microcrystalline phase at 900-1020° C., realizing complete conversion of glass phase at a low temperature.

2. The present application also provides a bond for composite grinding wheel comprising a glass ceramic and a glass with a mass ratio of (20-50):(50-80). The glass phase in the bond has a low flow temperature and can work together with the glass ceramic phase to wrap abrasive particles, realizing low-temperature sintering of the grinding wheel. In addition, the existing of microcrystalline phase in the bond results in a high mechanical strength of the obtained grinding wheel. Moreover, the glass ceramics in the bond are completely composed of microcrystalline phase, so when the glass ceramics is combined with glass to form a bond for composite grinding wheel, the amount of microcrystalline phase and glass phase are definite, thereby avoiding performance change of the grinding wheel due to sintering temperature fluctuation of the grinding wheel, so the performance stability is increased. The grinding wheel prepared with the bond of the present application is found to have stable mechanical strength.

3. The bond for composite grinding wheel provided by the application is prepared from raw materials comprised of kaolin, silica, diboron trioxide, lithium superoxide, albite, potassium feldspar, talc, dolomite, phosphorus pentoxide, and yttrium oxide, wherein kaolin, talc, dolomite, potassium feldspar and albite are mineral raw materials, which can significantly reduce the cost for raw materials of the bond. Meanwhile, due to the low melting point of mineral raw materials and the fluxing property of boron trioxide, potassium feldspar and albite, the raw material of the application can be melted into a glass liquid at a low temperature, thereby reducing energy consumption. Moreover, the glass ceramic prepared from the raw materials of the present application has an expansion coefficient that matches with the expansion coefficient of corundum abrasive, which can prevent formation of micro-cracks during sintering, so the strength of the grinding wheel is increased.

4. According to the preparation method of the bond for composite grinding wheel provided in the present application, the glass ceramic has the same chemical composition as the glass, therefore the chemical composition of the bond itself is uniform, and the uniform chemical composition is undoubtedly beneficial to the stability of the mechanical strength of the grinding wheel.

5. When preparing a composite grinding wheel with the bond provided in the present application, the sintering temperature of the grinding wheel is lower than the microcrystallization treatment temperature by 50° C. or more. Such sintering temperature does not affect the structure and performance of the glass ceramic particles. For the glass particles, such sintering temperature does not reach the temperature for crystallization yet. Therefore, the stability can be ensured at this sintering temperature. Even if there is a certain range of temperature fluctuation during the sintering process of the grinding wheel, the performance of the bond composed of glass ceramic and the glass will not be affected as long as the upper limit of the temperature fluctuation does not reach the microcrystallization temperature of the glass. Thus the mechanical strength of the grinding wheel prepared with the bond of the present application is relatively stable, and the yield of qualified product is high.

In summary, the preparation method of the bond for composite grinding wheel of the present application not only overcomes the disadvantage of the non-uniform composition of the traditional ceramic bond, but also avoids the disadvantage of low strength of the glass bond, and simultaneously solves the problem that the grinding wheel prepared by the conventional glass ceramics has unstable mechanical strength and low yield of qualified product.

BRIEF DESCRIPTION OF THE DRAWINGS

In order to illustrate the detailed description of the present application or the technical solutions in the prior art more clearly, the drawings used in the detailed description or the prior art will be briefly described below. Obviously, the drawings in the following description are only some embodiments of the present application, and other drawings can be obtained by those skilled in the art without paying creative labor.

DETAILED DESCRIPTION

Figure 1:
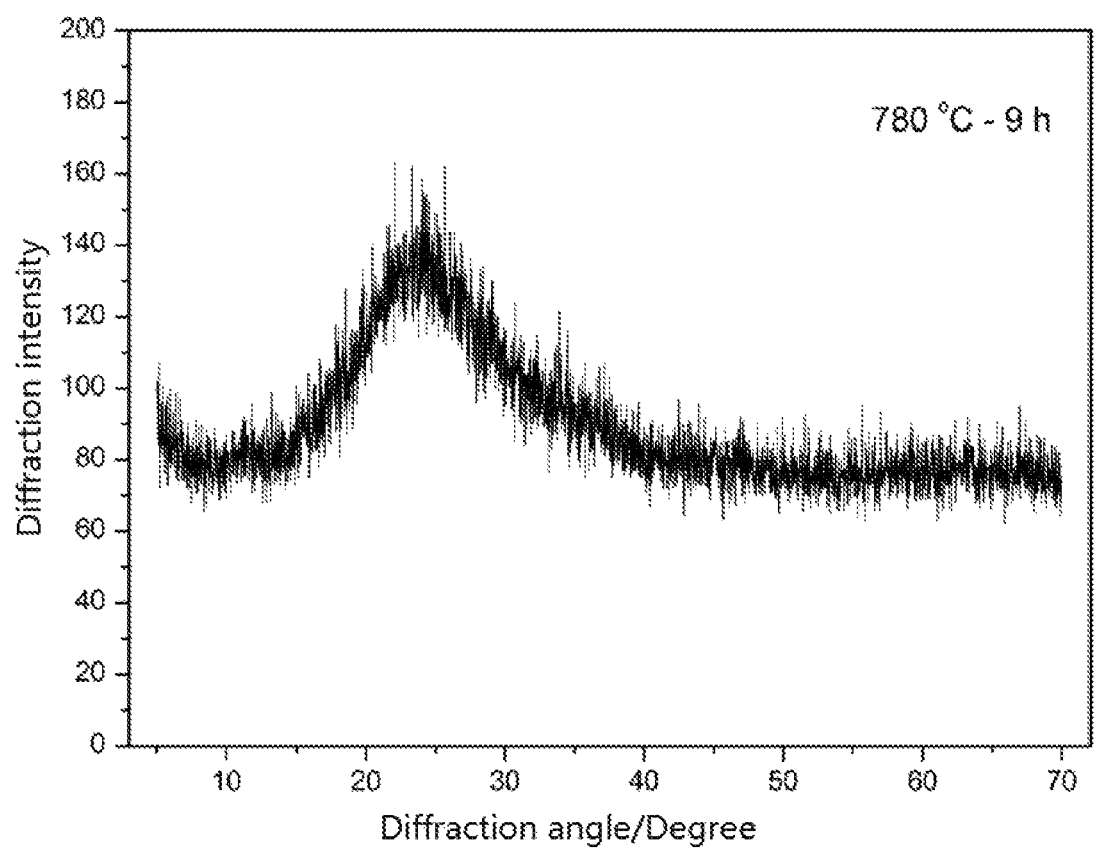
FIG. 1 is an XRD pattern of the glass ceramic particle converted after the microcrystallization heat treatment of the glass particles in Example 1 of the present application.

The technical solutions of the present application will be described clearly and completely hereinafter, and it is obvious that the described embodiments are only part but not all of the embodiments of the present application. All other embodiments obtained by those skilled in the art based on the embodiments of the present application without paying creative efforts fall within the scope of the present application. Furthermore, the technical features involved in the different embodiments of the present application described below can be combined with each other as long as they are not in conflict with each other.

Example 1

The example provides a bond for composite grinding wheel. The bond is composed of glass ceramic and glass at a mass ratio of 42:58. The glass ceramic and the glass are prepared from same raw materials which comprise kaolin 47 g, silica 6 g, diboron trioxide 6 g, lithium superoxide 2 g, albite 10 g, potassium feldspar 10 g, talc 5 g, dolomite 10 g, phosphorus pentoxide 2 g, and yttrium oxide 2 g.

The example further provides a preparation method of the bond, comprising the following steps:
(1) The raw materials of the above weights are taken to pass through a sieve of 120 mesh, and then mixed uniformly, and melted into a glass liquid at 1320° C. and held at this temperature for 1.5 hours to promote homogenization of the glass liquid;
(2) The glass liquid is poured to water of room temperature for water quenching, and then dried at 140° C. to obtain glass particles;
(3) The glass particles are heated at 1010° C. for 1.0 hour to obtain the glass ceramic particles;
(4) The glass ceramic particles are mixed with the glass particles obtained in the step (2) at a mass ratio of 42:58 to obtain a mixture, and then the mixture is mechanically crushed and passed through a sieve of 20 mesh, and then ball ground in a ball mill, and then passed through a sieve of 500-mesh to obtain the bond for composite grinding wheel.

The example also provides a method for preparing a grinding wheel from the bond prepared above and an abrasive material:

A corundum abrasive, the bond for composite grinding wheel and a modified starch are mixed and then molded to a grinding wheel green body at a pressure of 20 MPa, and then the molded grinding wheel green body is held at 780° C. for 9 hours to obtain a corundum grinding wheel;

After detection, the corundum grinding wheel has a bending strength of 62.6 MPa.

Example 2

The example provides a bond for composite grinding wheel. The bond is composed of glass ceramic and glass at a mass ratio of 35:65. The glass ceramic and the glass are prepared from same raw materials which comprise kaolin 42 g, silica 8 g, and diboron trioxide 7 g, lithium superoxide 1 g, albite 11 g, potassium feldspar 9 g, talc 7 g, dolomite 11 g, phosphorus pentoxide 3 g, and yttrium oxide 1 g;

The example further provides a preparation method of the above bond, comprising the following steps:
(1) The raw materials of the above weights are taken to pass through a sieve of 120 mesh, and then mixed uniformly and melted into a glass liquid at 1270° C. and held at this temperature for 2.0 hours to promote homogenization of the glass liquid;
(2) The glass liquid is poured to water of room temperature for water quenching, and then dried at 130° C. to obtain glass particles;
(3) The glass particles are heated at 970° C. for 1.5 hour to obtain the glass ceramic particles;
(4) The glass ceramic particles are mixed with the glass particles obtained in the step (2) at a mass ratio of 35:65 to obtain a mixture, and then the mixture is mechanically crushed and passed through a sieve of 20 mesh, and then ball ground in a ball mill, and then passed through a sieve of 500-mesh to obtain the bond for composite grinding wheel.

The example also provides a method for preparing a grinding wheel from the bond prepared above and an abrasive material:

A corundum abrasive, the bond for composite grinding wheel and a modified starch are mixed and then molded to a grinding wheel green body at a pressure of 50 MPa, and then the molded grinding wheel green body is held at 810° C. for 6 hours to obtain a corundum grinding wheel;

After detection, the corundum grinding wheel has a bending strength of 63.5 MPa.

Example 3

The example provides a bond for composite grinding wheel. The bond is composed of glass ceramic and glass at a mass ratio of 20:80. The glass ceramic and the glass are prepared from same raw materials which comprise kaolin 40 g, silica 15 g, diboron trioxide 5 g, lithium superoxide 3 g, albite 10 g, potassium feldspar 12 g, talc 5 g, dolomite 17 g, phosphorus pentoxide 2 g, and yttrium oxide 2 g;

The example further provides a preparation method of the above bond, comprising the following steps:
(1) The raw materials of the above weights are taken to pass through a sieve of 120 mesh, and then mixed uniformly and melted into a glass liquid at 1200° C. and held at this temperature for 2.0 hours to promote homogenization of the glass liquid;
(2) The glass liquid is poured to water of room temperature for water quenching, and then dried at 120° C. to obtain glass particles;
(3) The glass particles are heated at 1020° C. for 0.5 hour to obtain the glass ceramic particles;
(4) The glass ceramic particles are mixed with the glass particles obtained in the step (2) at a mass ratio of 20:80 to obtain a mixture, and then the mixture is mechanically crushed and passed through a sieve of 20 mesh, and then ball ground in a ball mill, and then passed through a sieve of 500-mesh to obtain the bond for composite grinding wheel.

The example also provides a method for preparing a grinding wheel from the bond prepared above and an abrasive material:

A corundum abrasive, the bond for composite grinding wheel and a modified starch are mixed and then molded to a grinding wheel green body at a pressure of 30 MPa, and then the molded grinding wheel green body is held at 760° C. for 7 hours to obtain a corundum grinding wheel;

After detection, the corundum grinding wheel has a bending strength of 63.0 MPa.

Example 4

The example provides a bond for composite grinding wheel. The bond is composed of glass ceramic and glass at a mass ratio of 50:51. The glass ceramic and the glass are prepared from same raw materials which comprise kaolin 60 g, silica 7 g, and diboron trioxide 10 g, lithium superoxide 1 g, albite 15 g, potassium feldspar 8 g, talc 10 g, dolomite 10 g, phosphorus pentoxide 7 g, and yttrium oxide 0.5 g;

The example further provides a preparation method of the above bond, comprising the following steps:
(1) The raw materials of the above weights are taken to pass through a sieve of 120 mesh, and then mixed uniformly and melted into a glass liquid at 1450° C. and held at this temperature for 1.0 hours to promote homogenization of the glass liquid;

(2) The glass liquid is poured to water of room temperature for water quenching, and then dried at 150° C. to obtain glass particles;

(3) The glass particles are heated at 900° C. for 2.5 hour to obtain the glass ceramic particles;

(4) The glass ceramic particles are mixed with the glass particles obtained in the step (2) at a mass ratio of 50:51 to obtain a mixture, and then the mixture is mechanically crushed and passed through a sieve of 20 mesh, and then ball ground in a ball mill, and then passed through a sieve of 500-mesh to obtain the bond for composite grinding wheel.

The example also provides a method for preparing a grinding wheel from the bond prepared above and an abrasive material:

A corundum abrasive, the bond for composite grinding wheel and a modified starch are mixed and then molded to a grinding wheel green body at a pressure of 40 MPa, and then the molded grinding wheel green body is held at 770° C. for 8 hours to obtain a corundum grinding wheel;

After detection, the corundum grinding wheel has a bending strength of 63.1 MPa.

Example 5

The example provides a bond for composite grinding wheel. The bond is composed of glass ceramic and glass at a mass ratio of 35:77. The glass ceramic and the glass are prepared from same raw materials which comprise kaolin 50 g, silica 12 g, and diboron trioxide 8 g, lithium superoxide 2 g, albite 13 g, potassium feldspar 10 g, talc 7 g, dolomite 12 g, phosphorus pentoxide 5 g, yttrium oxide 1 g;

The example further provides a preparation method of the above bond, comprising the following steps:

(1) The raw materials of the above weights are taken to pass through a sieve of 120 mesh, and then mixed uniformly and melted into a glass liquid at 1350° C. and held at this temperature for 1.5 hours to promote homogenization of the glass liquid;

(2) The glass liquid is poured to water of room temperature for water quenching, and then dried at 140° C. to obtain glass particles;

(3) The glass particles are heated at 1000° C. for 2.0 hour to obtain the glass ceramic particles;

(4) The glass ceramic particles are mixed with the glass particles obtained in the step (2) at a mass ratio of 35:77 to obtain a mixture, and then the mixture is mechanically crushed and passed through a sieve of 20 mesh, and then ball ground in a ball mill, and then passed through a sieve of 500-mesh to obtain the bond for composite grinding wheel.

The example also provides a method for preparing a grinding wheel from the bond prepared above and an abrasive material:

A corundum abrasive, the bond for composite grinding wheel and a modified starch are mixed and then molded to a grinding wheel green body at a pressure of 35 MPa, and then the molded grinding wheel green body is held at 790° C. for 8 hours to obtain a corundum grinding wheel;

After detection, the corundum grinding wheel has a bending strength of 63.3 MPa.

Comparative Example 1

A glass ceramic bond and a corundum grinding wheel are prepared by a method disclosed in Example 1 of Chinese patent application CN107160296A.

Experimental Example 1

Figure 2:
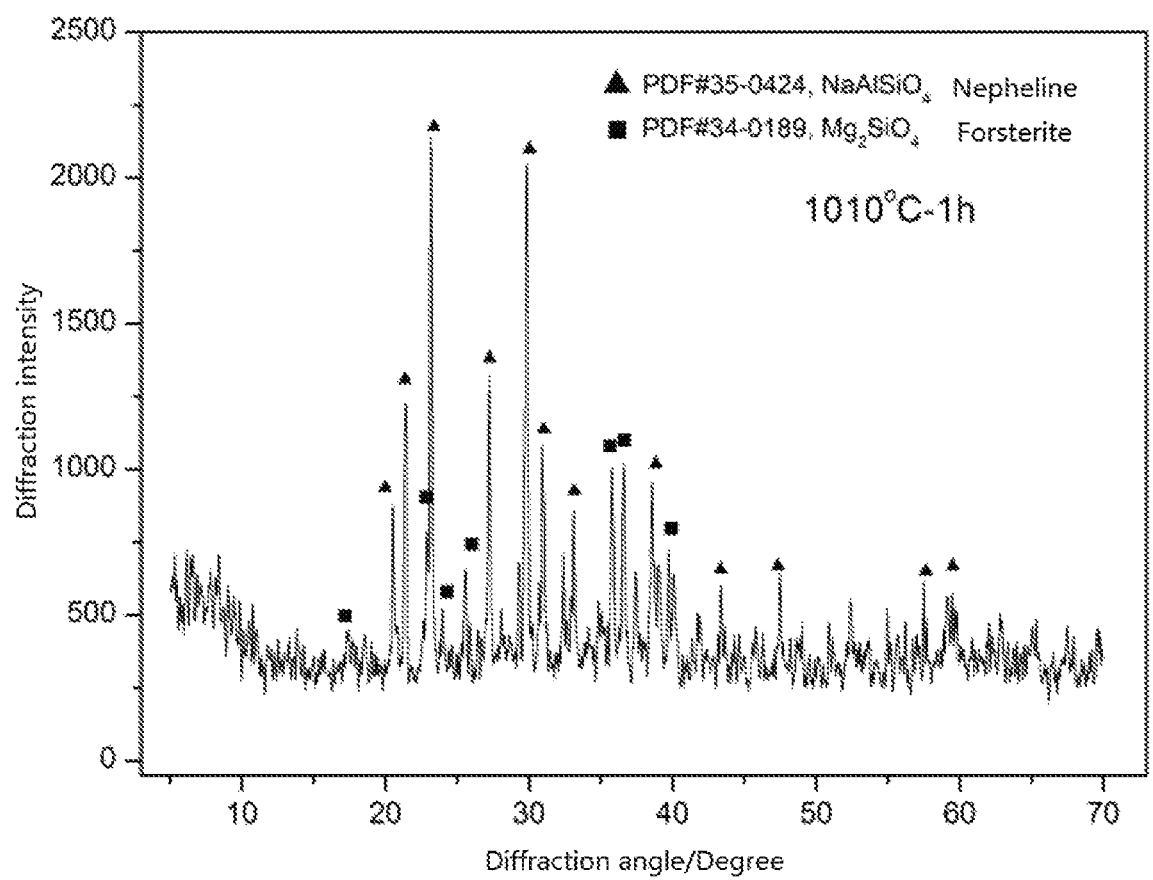
FIG. 2 is an XRD pattern of the glass particle in Example 1 of the present application after heat treatment at the sintering temperature of the grinding wheel.

The glass particles prepared in Example 1 are heat treated at 1010° C. for 1.0 hour to obtain glass ceramic particles which are then subjected to XRD characterization to obtain XRD patterns as shown in FIG. 1. As can be seen from FIG. 1, the glass phases in the glass particles obtained in Example 1 have all been converted into glass ceramic phases after heat treatment at 1010° C. for 1.0 hour;

The glass particles prepared in Example 1 are heat treated at 780° C. for 9 hours, then subjected to XRD characterization to obtain XRD pattern as shown in FIG. 2. As can be seen from FIG. 2, the glass phases in the glass particles obtained in Example 1 are not converted to glass ceramic phases after heat treatment at 780° C. for 9 hours.

As can be seen from FIG. 1 and FIG. 2, the bond for composite grinding wheel in the example of the present application can maintain the stability of the phases thereof, so that the mechanical strength of the grinding wheel prepared with the bond is relatively stable.

Experimental Example 2

200 corundum grinding wheels are prepared according to the preparation methods of Examples 1-5 and Comparative Example 1, The corundum grinding wheel which has a bending strength greater than 50 MPa is regarded as a qualified product. The number of the qualified products prepared in Examples 1-5 and Comparative Example 1 are shown in Table 1.

TABLE 1

Qualified rate of 100 pieces of ceramic articles prepared in Examples 1-5 and Comparative Example 1

|  | Qualified rate |
|---|---|
| Example 1 | 96% |
| Example 2 | 97% |
| Example 3 | 98% |
| Example 4 | 96% |
| Example 5 | 97% |
| Comparative example 1 | 85% |

As can be seen from Table 1, the corundum grinding wheel prepared in Examples 1-5 of the present application has a high qualified rate, indicating that the grinding wheel prepared with the bond of the present application has a relatively stable mechanical strength.

Obviously, the above-described embodiments are merely for clear illustration of the examples, and are not intended to limit the embodiments. Other variations or modifications of the different forms can be made by those skilled in the art based on the above description. There is no need and no way to exhaust all of the embodiments. Obvious variations or modifications resulting therefrom fall within the scope of the application.

The invention claimed is:

1. A method of preparing a glass ceramic, comprising
   (1) preparing a mixture by mixing the following raw materials uniformly: 40-60 parts by weight of kaolin, 7-15 parts by weight of silica, 5-10 parts by weight of diboron trioxide, 1-3 parts by weight of lithium superoxide, 10-15 parts by weight of albite, 8-12 parts by weight of potassium feldspar, 5-10 parts by weight of talc, 10-17 parts by weight of dolomite, 2-7 parts by weight of phosphorus pentoxide, and 0.5-2 parts by weight of yttrium oxide, melting the mixture at a temperature and holding at this temperature to obtain a glass liquid;

(2) quenching the glass liquid with water and drying to obtain glass particles; and (3) heating the glass particles at 900° C.-1020° C. for 0.5-2.5 hours to obtain the glass ceramic.

2. The method according to claim 1, wherein in the step (1), the raw materials have a particle size of no less than 120 mesh, and the mixture is melted at 1200° C.-1450° C. and held at this temperature for 1-2 hours to obtain the glass liquid.

3. The method according to claim 1, wherein in the step (2), the glass liquid is quenched by pouring it to room temperature water and then dried at 120° C.–150° C. to obtain the glass particles.

4. The method according to claim 2, wherein in the step (2), the glass liquid is quenched by pouring it to room temperature water and then dried at 120° C.-150° C. to obtain the glass particles.

\* \* \* \* \*